(12) United States Patent
Yang

(10) Patent No.: US 8,274,490 B2
(45) Date of Patent: Sep. 25, 2012

(54) TOUCH PANEL AND ELECTRONIC DEVICE USING THE SAME

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 521 days.

(21) Appl. No.: 12/646,844

(22) Filed: Dec. 23, 2009

(65) Prior Publication Data

US 2011/0032195 A1    Feb. 10, 2011

(30) Foreign Application Priority Data

Aug. 7, 2009    (CN) .......................... 2009 1 0305361

(51) Int. Cl.
*G06F 3/041* (2006.01)
(52) U.S. Cl. .................. 345/173; 345/107; 359/296
(58) Field of Classification Search .................. 345/107, 345/173; 359/296
See application file for complete search history.

(56) References Cited

U.S. PATENT DOCUMENTS

| 7,907,126 B2* | 3/2011 | Yoon et al. ..................... 345/173 |
| 7,957,052 B2* | 6/2011 | Kawase et al. ................. 359/296 |
| 8,217,913 B2* | 7/2012 | Hotelling et al. ............. 345/173 |
| 2008/0030844 A1* | 2/2008 | Choi et al. ..................... 359/296 |
| 2010/0097685 A1* | 4/2010 | Kawase et al. ................ 359/290 |
| 2010/0201677 A1* | 8/2010 | Takei et al. .................... 345/213 |

* cited by examiner

*Primary Examiner* — Van Chow
(74) *Attorney, Agent, or Firm* — Altis Law Group, Inc.

(57) ABSTRACT

A touch panel includes a touch layer, a first Indium Tin Oxide (ITO) electrode layer, a second ITO layer, and a microcapsule layer. The first ITO electrode layer includes a plurality of first ITO electrode. The second ITO electrode layer includes a plurality of second ITO electrodes. Each of the first ITO electrodes and one corresponding second ITO electrode forms an electrode unit. The microcapsule layer includes a plurality of microcapsules. Each microcapsule is connected to the first ITO electrode and the corresponding second ITO electrode. Each microcapsule comprises a plurality of positively charged particles and negatively charged particles. When the touch panel is touched, the distribution of the positively and negatively charged particles in the microcapsule corresponding to the touch portion of the touch layer is placed in a polarization state. An electronic device using the touch panel is also provided.

15 Claims, 4 Drawing Sheets

TOUCH PANEL AND ELECTRONIC DEVICE USING THE SAME

BACKGROUND

1. Technical Field

The present disclosure relates to touch panels and electronic devices and, particularly, to an electronic device using a touch panel.

2. Description of Related Art

Generally, there are three types of touch panels, the resistance film type, the surface ultrasonic wave type, and the electrostatic capacity type. The resistance film type touch panel is very popularly used.

The resistance film type touch panel has a structure in which a flexible transparent electrode plate is provided with a transparent electrode layer, and a fixed (rigid) transparent electrode plate is also provided with a transparent electrode layer. The flexible transparent electrode plate and the rigid transparent electrode plate are arranged spaced apart from each other via a spacer such that their transparent electrode layers face each other. When the touch panel is pressed, the flexible electrode plate is deformed, and a corresponding point of the transparent electrode layer touches with the transparent electrode layer of the rigid electrode plate, thus the two electrodes are electrically connected to each other, thereby position of the touch is detected.

As described above, the flexible electrode plate must be deformed with each, resulting in a short product lifespan.

BRIEF DESCRIPTION OF THE DRAWINGS

The components of the drawings are not necessarily drawn to scale, the emphasis instead being placed upon clearly illustrating the principles of a touch panel and an electronic device using the same. Moreover, in the drawings, like reference numerals designate corresponding parts throughout several views.

DETAILED DESCRIPTION

Figure 1:
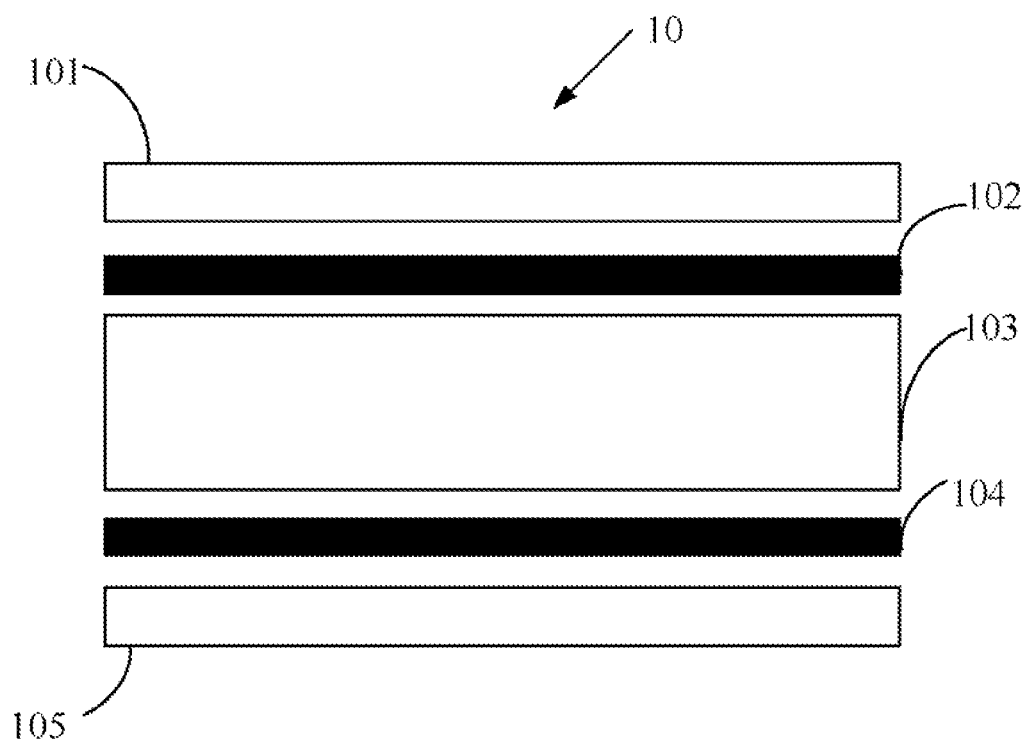
FIG. 1 is a schematic structural view of a touch panel in accordance with an exemplary embodiment.

Referring to FIG. 1, an embodiment of a touch panel 10 is illustrated. The touch panel 10 includes a touch layer 101, a first Indium Tin Oxide (ITO) electrode layer 102, a microcapsule layer 103, a second ITO layer 104, and a substrate 105. The touch layer 101 is exposed to users. In the embodiment, the touch layer 101 is made of conductive material. The first ITO layer 102 is disposed below the touch layer 101. The microcapsule layer 103 is disposed between the first ITO layer 102 and the second ITO layer 104. The microcapsule layer 103 is electrically connected to the first ITO layer 102 and the second ITO layer 104. The substrate 105 is configured for supporting the touch layer 101, the first ITO layer 102, the microcapsule layer 103, and the second ITO layer 104.

Figure 2:
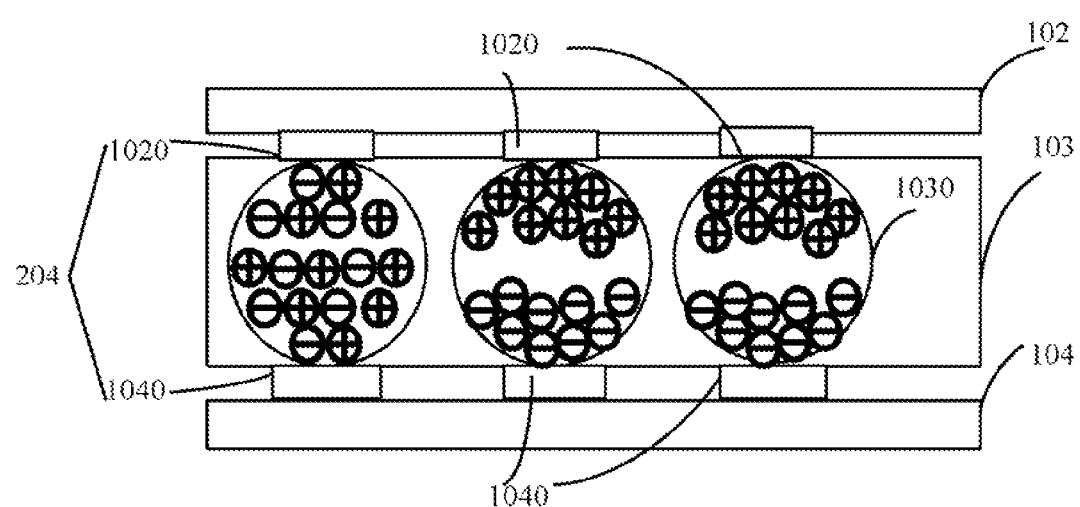
FIG. 2 is a partial, schematic structural view of the touch panel of FIG. 1, showing a microcapsule layer of the touch panel electrically connected to a first electrode layer and a second electrode layer of the touch panel.

Referring also to FIG. 2, the first ITO layer 102 includes a plurality of first ITO electrodes 1020, and the second ITO layer 104 includes a plurality of second ITO electrodes 1040. Each of the first ITO electrodes 1020 corresponds to one second ITO electrode 1040, and each of the first ITO electrodes 1020 and the corresponding second ITO electrode 1040 form an electrode unit 204.

The microcapsule layer 103 includes a plurality of microcapsules 1030. In the embodiment, each of the microcapsules 1030 is made of conductive material. Each of the microcapsules 1030 is electrically connected to the first ITO electrode 1020 and the corresponding second ITO electrode 1040. Each of the microcapsules 1030 includes a plurality of positively charged particles and a plurality of negatively charged particles therein. Each of the charged particles is wrapped with insulative material.

When no touch is exerted on the touch layer 101, the distribution of the positively and negatively charged particles in each of the microcapsules 1030 is in a uniform state. When the touch layer 101 is touched by a user, the distribution of the positively and negatively charged particles in the microcapsule 1030 corresponding to the touched portion of the touch layer 101 is placed in a polarization state due to the effect of the user's static electricity. That is, the positively charged particles move to one side of the corresponding microcapsule 1030, and the negatively charged particles move to an opposite side of the corresponding microcapsule 1030, thus a voltage difference is formed across the electrode unit 204 connected to the corresponding microcapsule 1030. When the touch of the touch layer 10 is removed, the distribution of the charged particles return to the uniform state, thus the voltage difference across the electrode unit 204 disappears.

Figure 3:
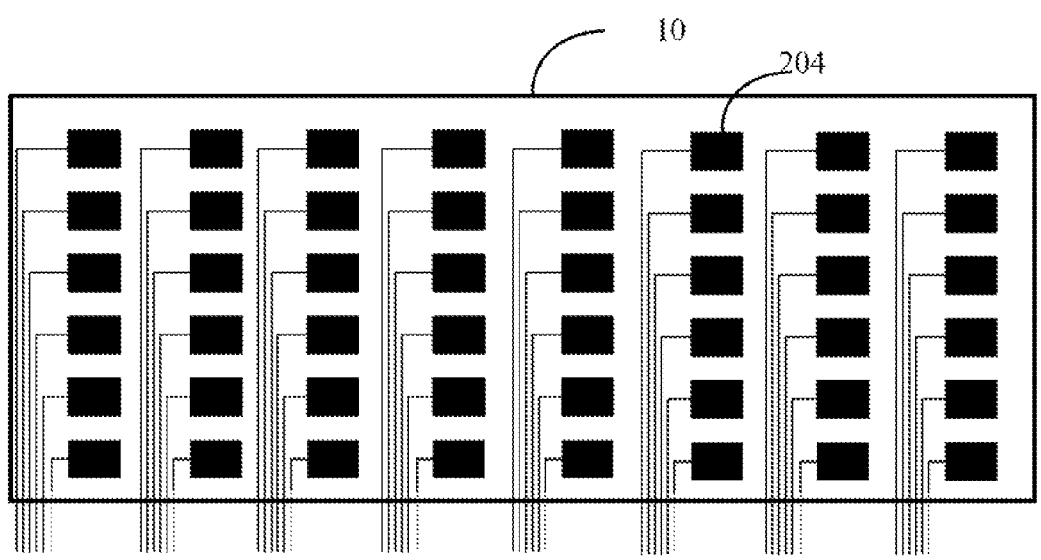
FIG. 3 is another schematic structural view of the touch panel of FIG. 1, showing a layout of electrodes of a first electrode layer or a second electrode layer of the touch panel.

Referring also to FIG. 3, the touch panel 10 includes a plurality of electrode units 204. The number of the electrode units 204 can be decided by the size of the touch panel 10. Each of the electrode units 204 is assigned with a coordinate for identification.

Figure 4:
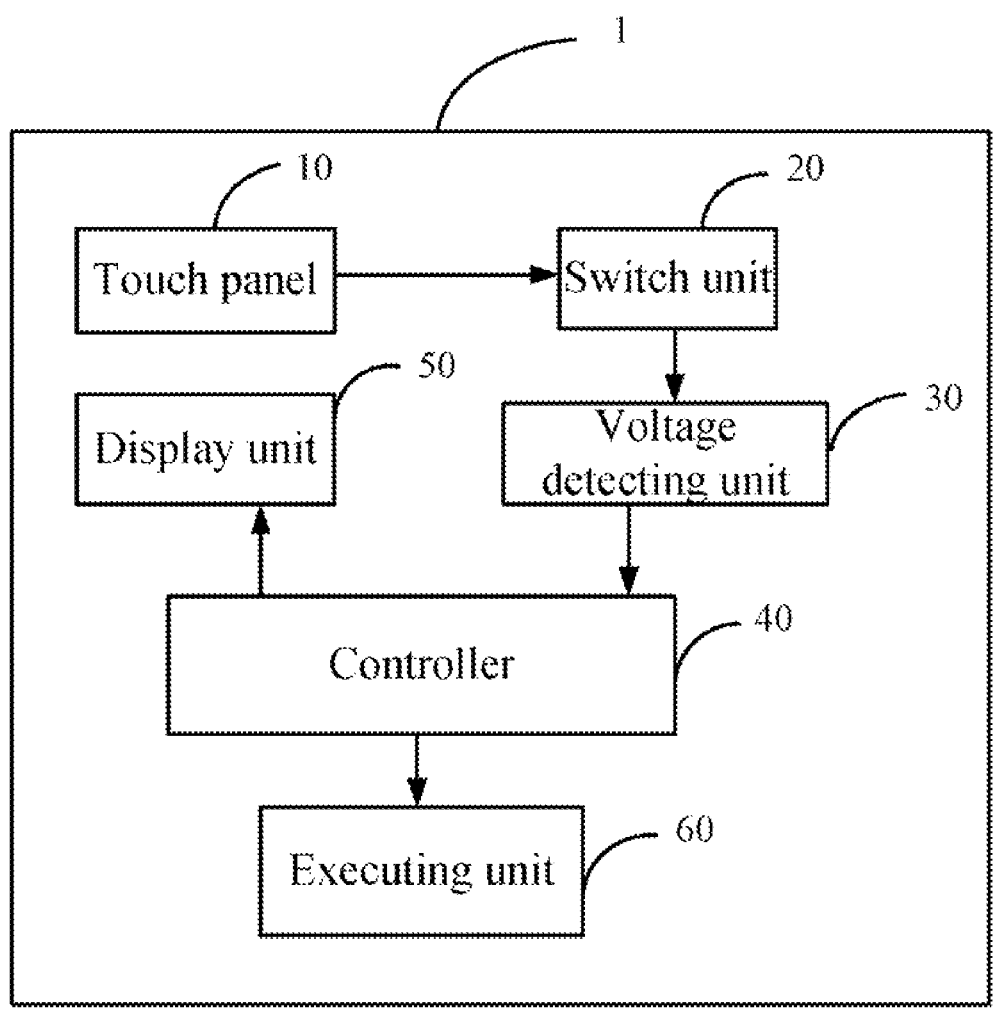
FIG. 4 is a block diagram of the electronic device using the touch panel of FIG. 1, in accordance with an exemplary embodiment.

Referring also to FIG. 4, an electronic device 1 using the touch panel 10 is illustrated. The electronic device 1 includes the touch panel 10, a switch unit 20, a voltage detecting unit 30, a controller 40, a display unit 50, and an executing unit 60.

The switch unit 20 is configured for controlling the electrical connection between each of the electrode units 204 and the voltage detecting unit 30 in sequence in a preset period. In the embodiment, the switch unit 20 is a Double Pole Double Throw (DPDT) switcher. The switch unit 20 includes a static contact point (not shown) and a pair of dynamic contact points (both not shown). The static point is electrically connected to the voltage detecting unit 20, and the dynamic contact points are connected to the first ITO electrode 1020 and the corresponding second ITO electrode 1040 of one electrode unit 204 in sequence, respectively. In the embodiment, the switch unit 20 is controlled by a pulse trigger (not shown).

The voltage detecting unit 30 is configured for detecting whether a voltage difference exists across the electrode unit 204 connected to the voltage detecting unit 30 via the switch unit 20. If the voltage difference exists, the voltage detecting unit 30 further determines the coordinate of the electrode unit 204.

The controller 40 is configured for receiving at least one coordinate from the detecting unit 30 in the preset period, and generating a signal corresponding to the at least one coordinate.

The executing unit 60 is configured for executing functions associated with the signal from the controller 40.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A touch panel comprising:
   a touch layer;
   a first Indium Tin Oxide (ITO) electrode layer disposed below the touch layer, wherein the first ITO electrode layer comprises a plurality of first ITO electrodes;
   a second ITO electrode layer comprising a plurality of second ITO electrodes, wherein each of the first ITO electrodes corresponds to one second ITO electrode, each of the first ITO electrodes and the corresponding second ITO electrode form an electrode unit; and
   a microcapsule layer comprising a plurality of microcapsules, wherein each of the microcapsules is electrically connected to the first ITO electrode and the second ITO electrode in one electrode unit, and each of the microcapsules comprises a plurality of positively charged particles and a plurality of negatively charged particles;
   wherein when no touch is exerted on the touch layer, the positively and negatively charged particles in the microcapsule is in a uniform state; and when the touch panel is touched by users, the distribution of the positively and negatively charged particles in the microcapsule corresponding to the touch portion of the touch layer is placed in a polarization state, thus a voltage difference across the electrode unit connected to the microcapsule is generated.

2. The touch panel as described in claim 1, further comprising a substrate for supporting the touch layer, the first ITO electrode layer, the microcapsule layer, and the second ITO electrode layer.

3. The touch panel as described in claim 1, wherein the touch layer is made of conductive material.

4. The touch panel as described in claim 1, wherein each of the microcapsules is made of nanometer conductive material.

5. The touch panel as described in claim 1, wherein each of the positively and negatively charged particles is wrapped with insulative material.

6. The touch panel as described in claim 1, wherein each of the electrode units is assigned with a coordinate for identification.

7. An electronic device comprising:
   a touch layer;
   a first Indium Tin Oxide (ITO) electrode layer disposed below the touch layer, wherein the first ITO electrode layer comprises a plurality of first ITO electrodes;
   a second ITO electrode layer comprising a plurality of second ITO electrodes, wherein each of the first ITO electrodes corresponds to one second ITO electrode, each of the first ITO electrodes and the corresponding second ITO electrode form an electrode unit;
   a microcapsule layer comprising a plurality of microcapsules, wherein each of the microcapsules is electrically connected to the first ITO electrode and the second ITO electrode in one electrode unit, and each of the microcapsules comprises a plurality of positively charged particles and a plurality of negatively charged particles;
   wherein when no touch is exerted on the touch layer, the positively and negatively charged particles in the microcapsule is in a uniform state; and when the touch panel is touched by users, the distribution of the positively and negatively charged particles in the microcapsule corresponding to the touch portion of the touch layer is placed in a polarization state, thus a voltage difference across the electrode unit connected to the microcapsule is generated.

8. The electronic device as described in claim 7, wherein each of the electrode unit is assigned with a coordinate for identification.

9. The electronic device as described in claim 8, further comprising a switch unit and a voltage detecting unit, wherein the switch unit is configured for controlling the electrical connection between each of the electrode units and the voltage detecting unit in sequence in a preset period, and the voltage detecting unit is configured for detecting the voltage difference of the electrode unit connected to the voltage detecting unit via the switch unit, and further for determining the coordinate of the electrode unit when the voltage difference exists in the electrode unit.

10. The electronic device as described in claim 9, further comprising a controller configured for receiving at least one coordinate from the voltage detecting unit in the preset period and generating a signal corresponding to the at least one electrode unit.

11. The electronic device as described in claim 10, further comprising an executing unit configured for executing functions corresponding to the signal from the controller.

12. The electronic device as described in claim 7, wherein further comprising a substrate for supporting the touch layer, the first ITO electrode layer, the microcapsule layer, and the second electrode layer.

13. The electronic device as described in claim 7, wherein the touch layer is made of conductive material.

14. The electronic device as described in claim 7, wherein each of the microcapsules is made of nanometer material.

15. The electronic device as described in claim 7, wherein each of the positively and negatively charged particles is wrapped with insulative material.

* * * * *